(12) United States Patent
Morales et al.

(10) Patent No.: US 7,469,808 B2
(45) Date of Patent: Dec. 30, 2008

(54) STABILIZING MEMBER FOR A BICYCLE CARRIER

(75) Inventors: Anthony Morales, South Lyon, MI (US); Jacob Belinky, Carleton, MI (US)

(73) Assignee: Cequent Towing Products, Plymouth, MI (US)

( * ) Notice: Subject to any disclaimer, the term of this patent is extended or adjusted under 35 U.S.C. 154(b) by 0 days.

(21) Appl. No.: 11/264,750

(22) Filed: Nov. 1, 2005

(65) Prior Publication Data
US 2006/0091173 A1    May 4, 2006

Related U.S. Application Data

(60) Provisional application No. 60/624,118, filed on Nov. 1, 2004.

(51) Int. Cl.
*B60R 11/00* (2006.01)
(52) U.S. Cl. ................... 224/555; 224/537; 224/924; 224/553; 224/571
(58) Field of Classification Search ............ 224/253, 224/531, 537, 917.5, 553, 571, 924, 555
See application file for complete search history.

(56) References Cited

U.S. PATENT DOCUMENTS

| | | | | |
|---|---|---|---|---|
| 1,899,280 A | | 2/1933 | Lidseen | |
| 5,056,700 A | * | 10/1991 | Blackburn et al. | 224/324 |
| 5,373,978 A | | 12/1994 | Buttchen et al. | |
| 5,573,165 A | | 11/1996 | Bloemer et al. | |
| 5,593,076 A | * | 1/1997 | Biondo | 224/488 |
| 5,938,093 A | * | 8/1999 | Bloemer et al. | 224/553 |
| 6,286,738 B1 | * | 9/2001 | Robins et al. | 224/314 |
| 6,386,407 B1 | * | 5/2002 | Erickson et al. | 224/282 |
| 6,431,423 B1 | * | 8/2002 | Allen et al. | 224/509 |
| 6,467,664 B2 | | 10/2002 | Robins et al. | |
| 6,516,986 B1 | * | 2/2003 | Lassanske et al. | 224/533 |
| 6,616,023 B1 | * | 9/2003 | Dahl et al. | 224/537 |
| 6,648,281 B1 | | 11/2003 | Lake | |

* cited by examiner

*Primary Examiner*—Tri M Mai
(74) *Attorney, Agent, or Firm*—Risto Pribisich; McDonald Hopkins LLC

(57) ABSTRACT

Stabilizer members for bicycle carriers often utilize a spool or hourglass shape that cannot accommodate different cross-sectional sizes of seat tube. This can often result in difficulties in adequately securing the bicycle to the bicycle carrier, and, therefore may result in damage to the bicycle, bicycle carrier, or even the vehicle. Accordingly, the bicycle carrier disclosed herein comprises a support member, a bracket attached to the support member, and a stabilizer member rotatably attached to the bracket, the stabilizer member including first and second faces, the first and second faces each including a channel having a radius of curvature wherein the radius of curvature of the first face is different than the radius of curvature of the second face.

20 Claims, 4 Drawing Sheets

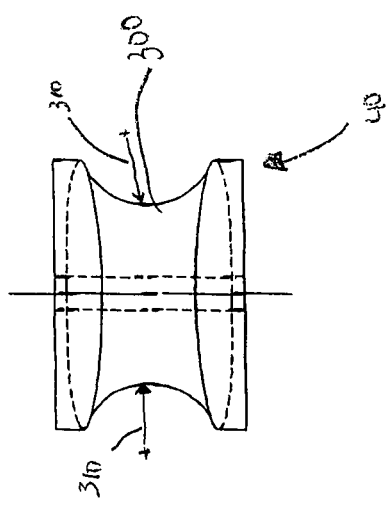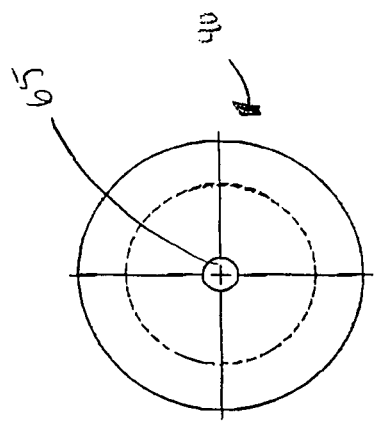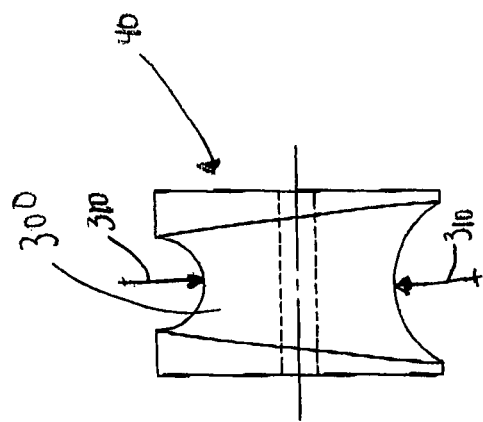
FIG. 4

STABILIZING MEMBER FOR A BICYCLE CARRIER

CROSS-REFERENCE TO RELATED APPLICATIONS

This application claims priority from U.S. Provisional Patent Application No. 60/624,118 filed on Nov. 1, 2004, which is hereby incorporated by reference.

FIELD OF THE INVENTION

The present invention is generally directed to a stabilizing member for a bicycle carrier, and more specifically to a stabilizing member of a bicycle carrier that accommodates different tube diameters of bicycles.

BACKGROUND OF THE INVENTION

The popularity of recreational cycling has grown substantially in recent years. As a result, the demand for bicycle carriers to transport bikes on cars and other vehicles has also grown.

There are various types of vehicle-mountable bicycle carriers available. One type is mountable on the rear hitch-mount of a vehicle to carry one or more bicycles adjacent the rear of the vehicle or ones mountable to the trunk of a vehicle. These types of carriers are usually configured to receive and hold the bike frame top tube in a saddle. One or more straps may be positioned around the bicycle to secure it to the carrier. Typically, the straps must be pulled tightly around the bicycle to hold it securely during normal driving speeds and conditions. Some users may find it difficult to apply sufficient tension to the strap. In addition, some users find it difficult to secure the strap while maintaining the desired tension. Furthermore, even normal acceleration or deceleration of the vehicle can cause the bicycles to swing or become misaligned on the rack, resulting in damage to the bikes and/or the vehicle.

Therefore, many bicycle carriers include stabilizers to further secure the bicycle to the bicycle carrier and prevent the bike from swinging forward to backward in its saddle. However, many of these stabilizers utilize a spool or hourglass shape that cannot accommodate different cross-sectional sizes/diameters of seat tube. This can often result in difficulties in adequately securing the bicycle to the bicycle carrier, and, therefore may result in damage to the bicycle, bicycle carrier, or even the vehicle.

SUMMARY OF THE INVENTION

An embodiment of the present invention is directed to a bicycle carrier. The bicycle carrier comprises a support member, a bracket attached to the support member, and a stabilizer member rotatably attached to the bracket, the stabilizer member including first and second faces, the first and second faces each including a channel having a radius of curvature wherein the radius of curvature of the first face is different than the radius of curvature of the second face.

Another embodiment of the present invention is directed to a bicycle carrier that comprises a support member, first and second brackets rotatably attached to the support member, a stabilizer member rotatably attached to the first and second brackets, the stabilizer member including first, second, and third faces, the first, second, and third faces each including a channel having a radius of curvature wherein the radius of curvature of each of the first, second, and third faces is different.

In yet another embodiment of the present invention, a bicycle carrier comprises a support member, a bracket attached to the support member, a stabilizer member rotatably attached to the bracket, the stabilizer member having a profile having a channel, the channel having a continuously varying radius of curvature over substantially all of the profile.

BRIEF DESCRIPTION OF THE DRAWINGS

Objects and advantages together with the operation of the invention may be better understood by reference to the following detailed description taken in connection with the following illustrations, wherein:

FIG. 4 is several views of yet another alternative embodiment of the stabilizer member of the present invention.

DETAILED DESCRIPTION

An embodiment of the present invention utilizes a stabilizer member that accommodates many different sized seat tubes so as to adequately secure a bicycle to the bicycle carrier. The stabilizer member of the present invention has multiple profiles or faces so that a user can match the appropriate profile or face of the stabilizer member to the bike seat tube to properly secure the bicycle to the bicycle carrier. More specifically, the stabilizer member of the present invention has a triangular prism, a multi-faceted prism, or a continuously variable groove that allows different cross-sectional diameters of bicycle seat tubes to be accommodated.

Figure 1:
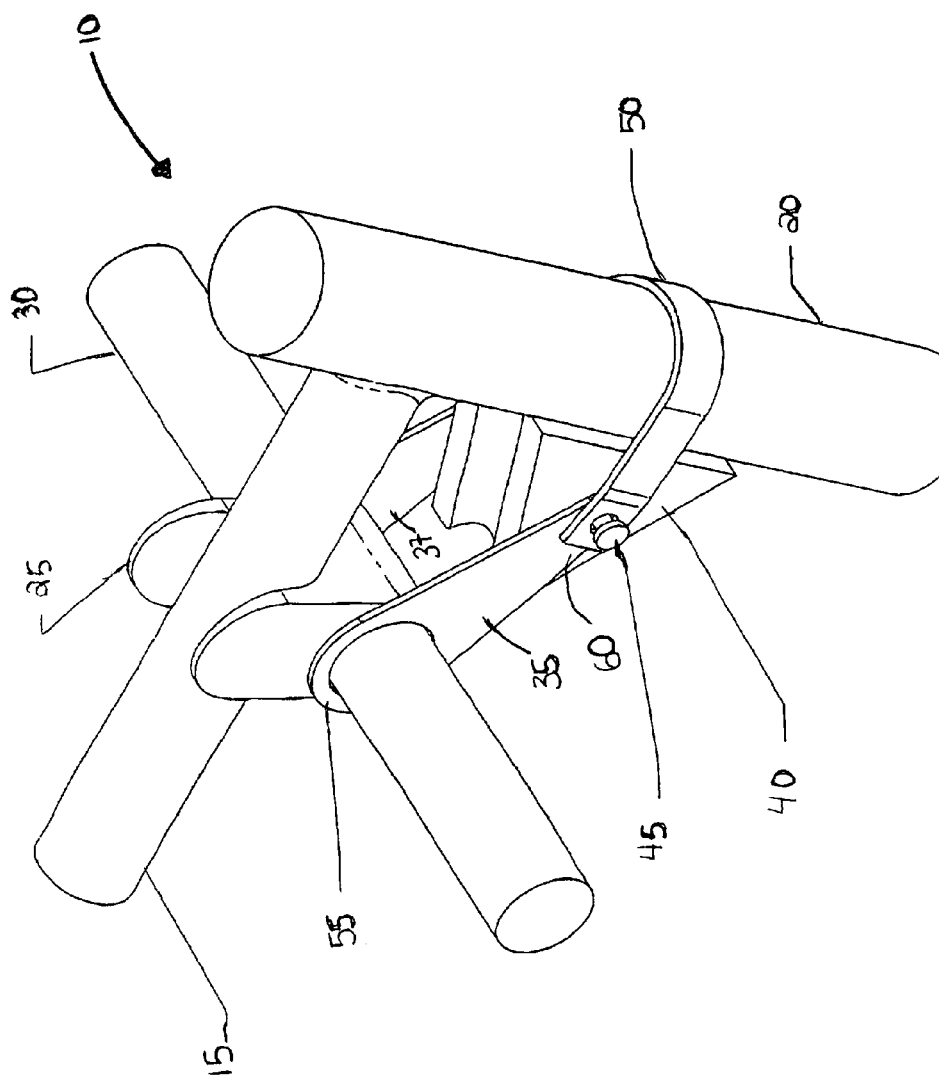
FIG. 1 is a perspective view of a bicycle secured to a bicycle carrier of an embodiment of the present invention.

Referring to FIG. 1, a bicycle carrier 10 is shown with a bike—only a bike-frame cross tube 15 and a bike-frame seat tube 20 are shown in FIG. 1—carried on the bicycle carrier 10. The bicycle carrier 10 includes at least one saddle 25 capable of holding a portion of a frame of a bicycle, at least one support member 30, at least a first and second bracket 35 and 37, at least one stabilizer member 40, at least one pin 45, and at least one strap 50. It should be understood, however, that the bicycle carrier 10 may include more than the one bike rack saddle 25, the one support member 30, the first and second brackets 35 and 37, the one stabilizer member 40, the one pin 45, and the one strap 50 shown in FIG. 1, especially when the bicycle carrier 10 is capable of carrying multiple bikes. In fact, to accommodate just one bike, the bicycle carrier 10 will likely include at least two support members 30 and two saddles 25, if not two of everything. Alternatively, the bicycle carrier 10 may include only one bracket, instead of the first and second brackets 35 and 37. In this embodiment, the one bracket is rotatably attached to the support member 30 and the stabilizing member 40 is rotatably attached to the bracket, similar to as described below.

As shown in FIG. 1, the support member 30 of the present embodiment is substantially a tubular and circular metal member. It should be understood, however, the support member 30 could also be of a noncircular shape and can be made of any sort of relatively rigid material such as plastic, hard rubber, etc. Further, the support member 30 has connected therewith the saddle 25. As shown in FIG. 1, the saddle 25 is slid onto the support member 30 and adhered thereto by a fastener (not shown) or another such element, or even welded thereto.

Further, the brackets 35 and 37 are rotatably connected with the support member 30 adjacent to the saddle 25. In particular, each bracket 35 and 37 has first sections 55 and second sections 60 (only shown on the first bracket 35). The first sections 55 are rotatably connected with the support member 30 and the second sections 60 re rotatably connected with the stabilizer member 40. As shown in FIG. 1, the saddle 25 is positioned between the first sections 55 of the brackets 35 and 37 on the support member 30. And the stabilizing member 40 is rotatably connected with the second sections 60 by means of the pin 45. The brackets 35 and 37 may rotate freely about the support member 30 allowing the stabilizing member 40 to fit against a seat tube 20 of a bicycle that is positioned either to the left or to the right of the saddle 25.

The strap 50 is non-removably connected with one of the second sections 60 of the brackets 35 and 37 and is removably connected with the other second section 60 of the brackets 35 and 37. As shown in FIG. 1, the strap 50 is non-removably connected with the second section of the second bracket 37 and is removably connected with the second section 60 of the first bracket 35. The pin 45 allows the stabilizing member 40 to rotate about the pin's axis freely about a hole 65 through the center of the stabilizing member 40 shown in FIG. 2, or alternatively, through a V-shaped slot 70 as shown in FIG. 3.

Figure 2:
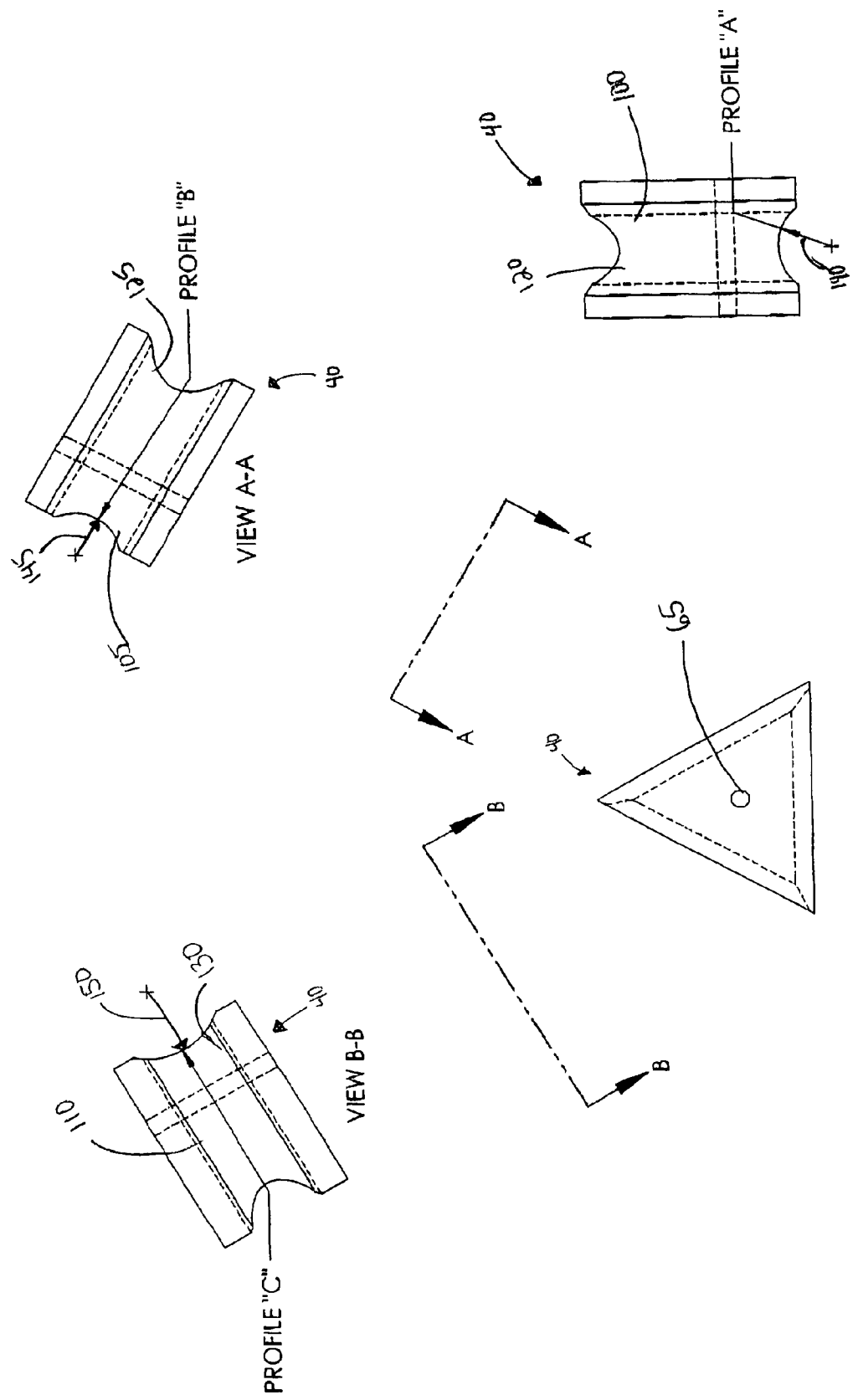
FIG. 2 is several views of an embodiment of a stabilizer member of the present invention.
Figure 3:
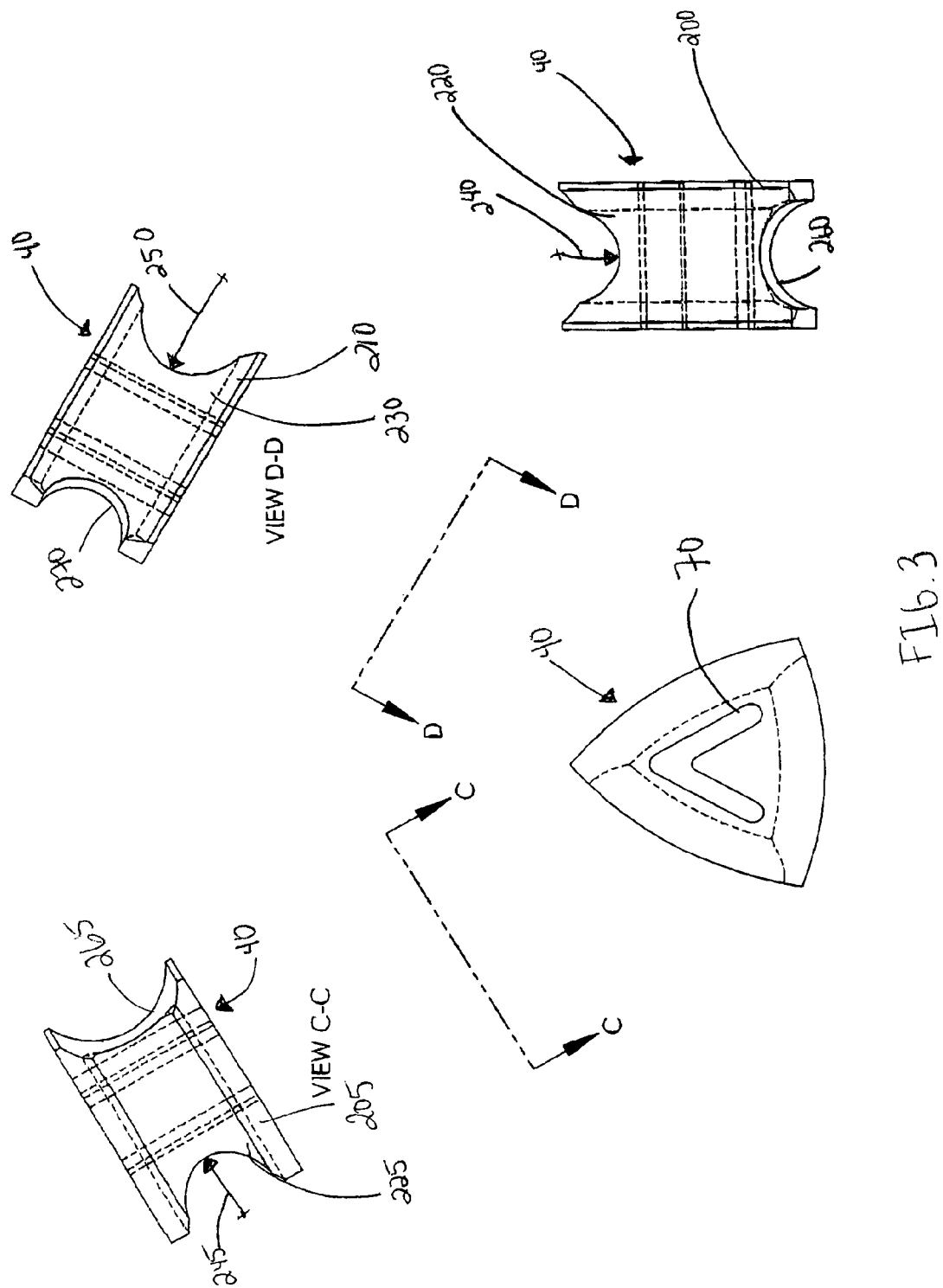
FIG. 3 is several views of an alternative embodiment of the stabilizer member of the present invention.

The stabilizing member 40 of the present invention, instead of having a circular profile as is common in the art, has a multi-faceted (two or more) profile as shown in FIGS. 2 through 4. In particular, as shown in FIGS. 2 and 3 the stabilizing member 40 has three-sided profiles or three faces. Each face of the triangular prism of the stabilizer member 40, as shown in FIGS. 2 and 3, is channeled with a circular cut having different radii. As shown in FIG. 2, the triangular prismatic shape of the stabilizer member 40 has three faces 100, 105, and 110. The three derived views are taken along A-A and B-B show the profiles labeled A, B, and C for the grooves 120, 125, and 130 in each of the three faces 100, 105, and 110. Each of these views show the different radii of curvature 140, 145, and 150 for the grooves 120, 125, and 130 on each of the three faces 100, 105, and 110. The function of the three faces 100, 105, and 110 with the different radiused grooves 120, 125, and 130 is to accommodate bike seat tubes having different diameters to produce an optimum fit of the bike to the bicycle carrier 10.

As shown in FIG. 3, the stabilizing member 40 may alternatively have the triangular prismatic shape having three faces 200, 205, and 210. As in FIG. 2, the stabilizer member 40 of FIG. 3 has grooves 220, 225, and 230 in each of the three faces 200, 205, and 210. Each of these views show different radii 240, 245, and 250 for the grooves 220, 225, and 230 on each of the three faces 200, 205, and 210. Instead of having the straight edges shown in FIG. 2, the edges 260, 265, 270 are curved concave to allow easier fit of the stabilizer member 40 against the seat tube 20 without requiring perfect alignment. Alternatively, the stabilizing member 40 may include just two faces, or may include four or more faces.

Finally, as shown in FIG. 4, the stabilizing member 40 may have a circular profile with a continuously variable groove 300. In this embodiment, the radius of curvature 310 of the groove is continuously variable, e.g., the radius of curvature is not the same anywhere along the circumference of the stabilizer member 40. This allows the stabilizer member 40 to be rotated to the position that provides the optimum fit. The purpose of this is to better accommodate the different tube diameters that exist in the bike market.

In operation, the bicycle carrier 10 has a bike loaded thereon. Once the bike is properly loaded on the bicycle carrier 10, the stabilizer member 40 is positioned to abut against the bike frame seat tube 20. If, however, the radius of curvature of the groove in the stabilizing member 40 does not quite fit the seat bike tube 20, the stabilizer member 40 may be rotated so that a different face with a different radiused groove may be employed for a better fit, or a portion of the stabilizer member 40 with a different radius of curvature may be employed for a better fit. Once the proper fit has been achieved, the user stretches the strap 50 over the seat tube 20 and removably connects the strap 50 with the pin 45.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

We claim:

1. A bicycle carrier comprising:
   a support member;
   a first bracket attached to said support member;
   a second bracket attached to said support member; and
   a stabilizer member rotatably attached to said first and second brackets, rotatably attached to said support member, and including a substantially V-shaped slot extending therethrough, said stabilizer member having a first face located on a first side of said stabilizing member, a second face located on a second side of said stabilizing member, and a third face located on a third side of said stabilizing member, said first face, second face, and third face unitarily formed from a same material, and each face including a channel having a radius of curvature along said face wherein said radius of curvature of each face is different than said radius of curvature of each other face;
   where said stabilizing member is rotatable to accommodate bicycle seat tubes of difference diameters.

2. The bicycle carrier of claim 1, wherein said stabilizing member includes substantially arcuate edges.

3. The bicycle carrier of claim 1, wherein said stabilizing member includes an aperture.

4. The bicycle carrier of claim 1, further comprising a pin insertable through said V-shaped slot to rotatably attach said stabilizing member between said first bracket and said second bracket.

5. The bicycle carrier of claim 1, further comprising a strap having a first portion and a second portion, wherein said first portion is removably attached to said first bracket and said second portion is attached to said second bracket, and wherein said strap is capable of holding a bicycle tube in contact with said stabilizing member.

6. A bicycle carrier comprising:
   a support member;
   first and second brackets rotatably attached to said support member;
   a saddle attached to said support member between said first bracket and said second bracket, said saddle capable of holding a portion of a frame of a bicycle; and
   a stabilizer member rotatably attached to said first and second brackets, said stabilizer member including a first face located on a first side of the stabilizing member, a second face located on a second side of the stabilizing member, and third face located on a third side of the stabilizing member, said first, second, and third faces unitarily formed from a same material, each face including a channel having a radius of curvature along said face wherein said radius of curvature of each of said first, second, and third faces is different.

7. The bicycle carrier of claim 6, wherein said stabilizing member has a triangular prismatic shape.

8. The bicycle carrier of claim 6, wherein said stabilizing member includes substantially straight edges.

9. The bicycle carrier of claim 6, wherein said stabilizing member is rotatable so that said first, second, and third faces of said stabilizing member can each accommodate a bicycle seat tube of a different diameter.

10. The bicycle carrier of claim 6, wherein said stabilizing member includes substantially arcuate edges.

11. The bicycle carrier of claim 6, further comprising a strap having a first portion and a second portion, wherein said first portion is removably attached to said first bracket and said second portion is attached to said second bracket, and wherein said strap is capable of holding a bicycle tube in contact with said stabilizing member.

12. The bicycle carrier of claim 6, wherein the stabilizing member is rotatably attached to said support member.

13. The bicycle carrier of claim 6, wherein said stabilizing member is rotatable to accommodate bicycle seats tubes of different diameters.

14. The bicycle carrier of claim 6, wherein the stabilizing member includes an aperture.

15. The bicycle carrier of claim 14, further comprising a pin insertable through said aperture to rotatably attach said stabilizing member between said first bracket and said second bracket.

16. The bicycle carrier of claim 6, wherein the stabilizing member includes a substantially V-shaped slot extending therethrough.

17. The bicycle carrier of claim 16, further comprising a pin insertable through said V-shaped slot to rotatably attach said stabilizing member between said first bracket and second bracket.

18. A bicycle carrier comprising:
a support member;
a first bracket attached to said support member;
a second bracket attached to said support member;
a stabilizer member rotatably attached to said first and second bracket, rotatably attached to said support member, and including an aperture, said stabilizer member having a first face located on a first side of said stabilizing member, a second face located on a second side of said stabilizing member, and a third face located on a third side of said stabilizing member, said first face, second face, and third face unitarily formed from a same material, and each face including a channel having a radius of curvature along said face wherein said radius of curvature of each face is different than said radius of curvature of each other face; and
a pin insertable through said aperture to rotatably attach said stabilizing member between said first bracket and said second bracket;
where said stabilizing member is rotatable to accommodate bicycle seat tubes of difference diameters.

19. The bicycle carrier of claim 18, wherein said stabilizing member includes substantially arcuate edges.

20. The bicycle carrier of claim 18, further comprising a strap having a first portion and a second portion, wherein said first portion is removably attached to said first bracket and said second portion is attached to said second bracket, and wherein said strap is capable of holding a bicycle tube in contact with said stabilizing member.

* * * * *